United States Patent [19]

Jackman

[11] 4,067,362
[45] Jan. 10, 1978

[54] REINFORCED RIBBED TUBULAR STRUCTURE AND METHOD OF MAKING SAME

[75] Inventor: Robert M. Jackman, Little Rock, Ark.

[73] Assignee: A. O. Smith-Inland, Inc., Milwaukee, Wis.

[21] Appl. No.: 654,356

[22] Filed: Feb. 2, 1976

[51] Int. Cl.² .............................................. F16L 9/14
[52] U.S. Cl. ................... 138/173; 138/121; 138/153
[58] Field of Search ............... 138/173, 145, 121, 122, 138/125, 126, 129, 154, 144, 172, 177, 178; 57/7, 144

[56] References Cited

U.S. PATENT DOCUMENTS

| B 530,263 | 3/1976 | Gilbu | 138/121 |
|---|---|---|---|
| 2,151,307 | 3/1939 | Smith | 138/130 |
| 3,063,303 | 11/1962 | Cadwallader | 138/122 X |
| 3,168,910 | 2/1965 | Galloway et al. | 138/121 X |
| 3,483,896 | 12/1969 | Grosh | 138/144 X |
| 3,498,038 | 3/1970 | Shulver | 57/7 |
| 3,644,866 | 2/1972 | Dearduriff | 57/144 X |
| 3,726,321 | 4/1973 | Phillips et al. | 138/123 |
| 3,991,550 | 11/1976 | Cohen | 57/144 |

FOREIGN PATENT DOCUMENTS 2,141,281   3/1973   Germany .............................. 138/121

*Primary Examiner*—Henry K. Artis
*Attorney, Agent, or Firm*—Andrus, Sceales, Starke & Sawall

[57] ABSTRACT

A pipe made of fiberglass or the like includes a helical reinforcing member bonded to its outer surface substantially over its length with adjacent convolutions spaced with respect to each other. The reinforcing member or rib includes a filament-wound composite of a series of continuous resin impregnated glass filaments arranged in a bundle and surrounded by a helical fiber having spaced adjacent convolutions. An alternative construction further includes a core of paper or plastic or metal within the bundle to increase the rib height. An auxiliary bundle forming apparatus is employed with a filament winding machine so that the same winding machine and additional lengths of continuous glass fibers drawn from a common storage station may be utilized to form both the fiberglass pipe and the reinforcing rib. A spiral guide may also be used with the auxiliary bundle forming apparatus and the filament winding machine to add an inexpensive elongated core to the bundle forming a reinforcing rib of increased height.

6 Claims, 11 Drawing Figures

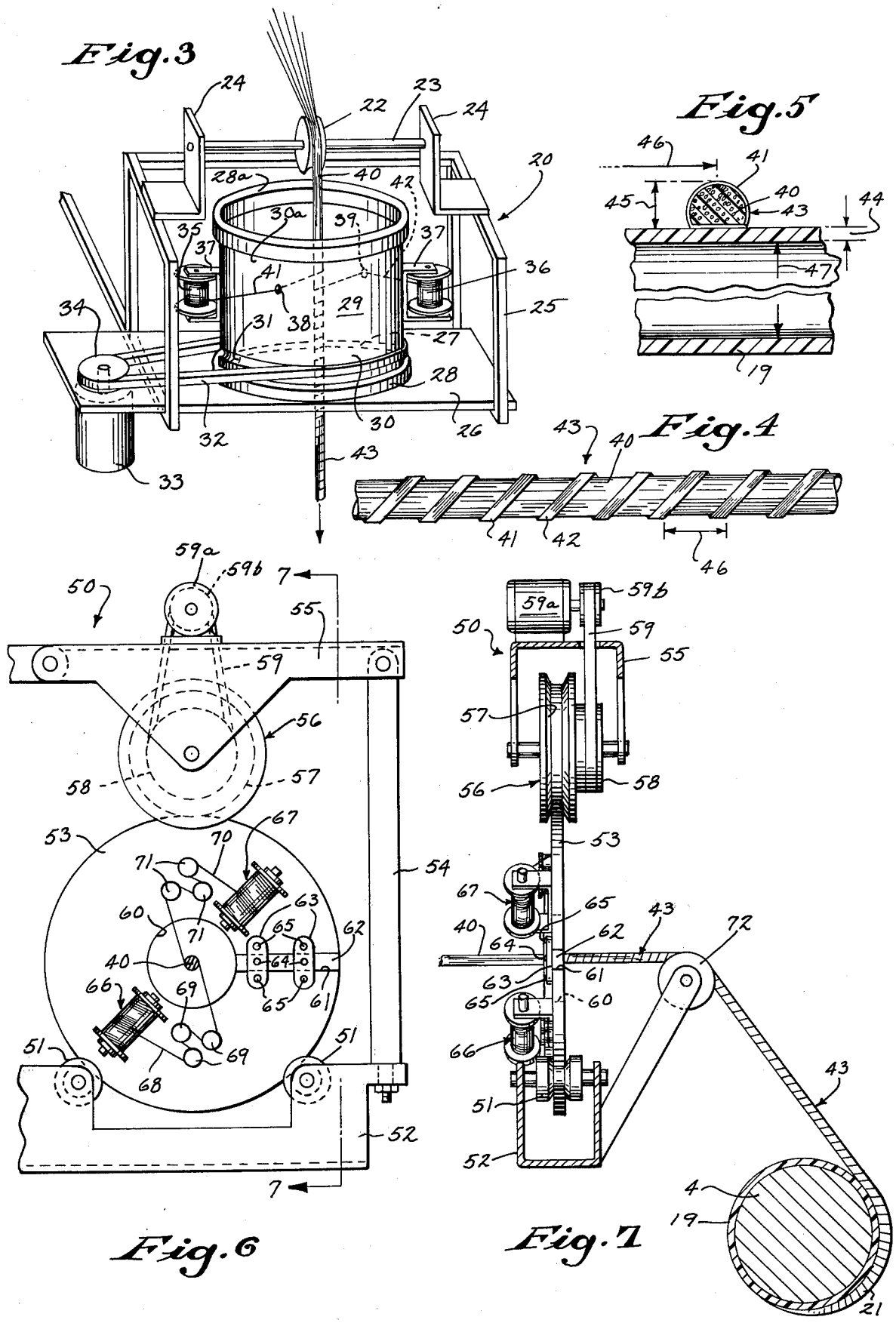

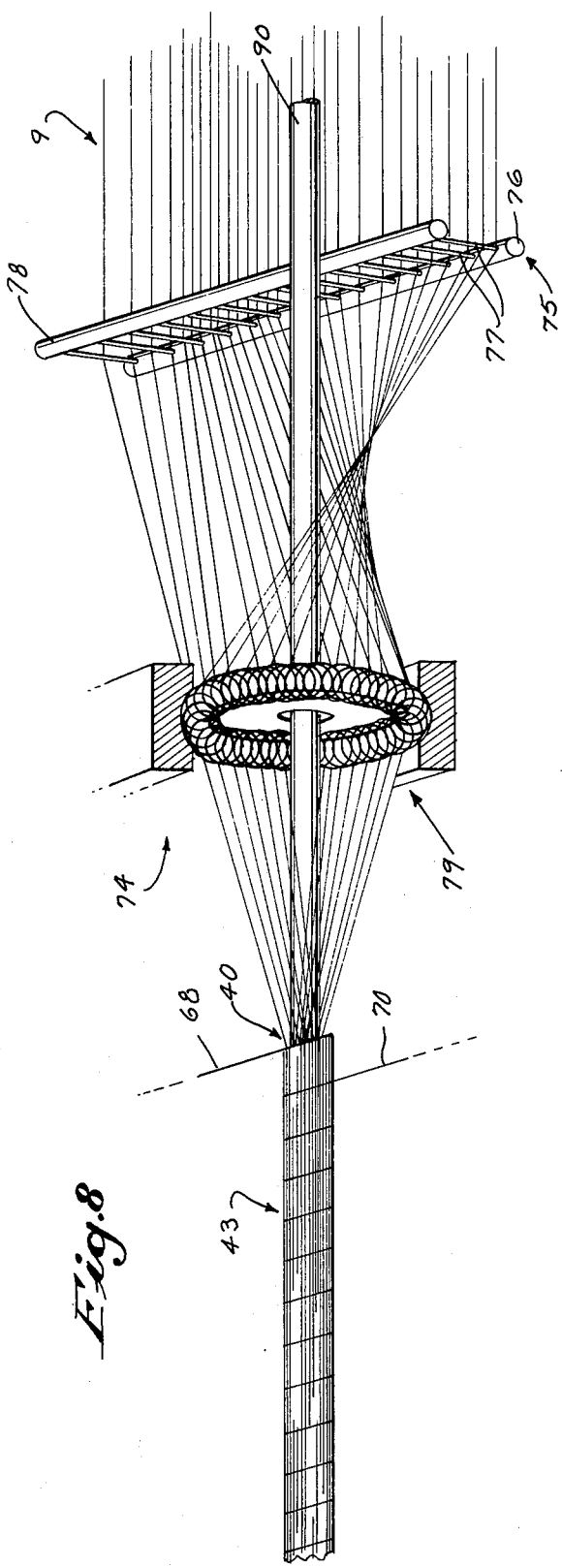
Fig.8
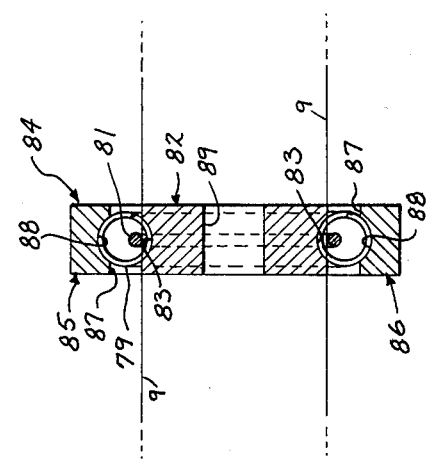
Fig.11
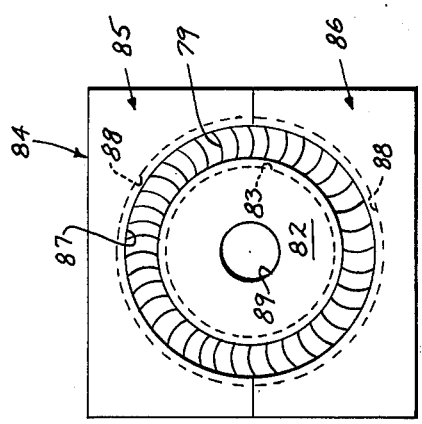
Fig.10
Fig.9

REINFORCED RIBBED TUBULAR STRUCTURE AND METHOD OF MAKING SAME

BACKGROUND OF THE INVENTION

This invention relates to a ribbed tubular structure having a reinforcing rib connected to an outer surface of a tubular member providing a collapse resistant rubber structure and method of making the same.

Filament wound pipes or tubes have been fabricated by winding a tape or web of fibers impregnated with resin or other binder on a mandrel in a number of superimposed layers. After the desired number of layers have been wound on the mandrel to provide the physical properties required, the resin is cured to provide an integral structure which is then stripped from the mandrel. As one example of a filament winding machine as disclosed in U.S. Pat. No. 3,499,815 issued on Mar. 10, 1970 to R. Hof, a mandrel is mounted for rotation, and a winding head or carriage moves in a reciprocating path of travel along the mandrel and guides or winds the fibrous tape about the mandrel in a helical pattern. The fibrous tape is formed of a multiplicity of individual elongated filaments or fibers which are stored in coil form on creels. Such individual filaments are unwound during a winding operation and grouped to form the tape or web. Such tape is impregnated with resin and passed over a distribution roller or other guide member to be wound onto the mandrel.

In a filament winding operation, the fibrous tape may be wound in a helical pattern which can either be a crossover pattern or a sequential pattern. In the crossover pattern, the turns in each pass are spaced apart and the turns in succeeding passes are wound in abutting side-by-side relation to the turns of the preceeding pass. In the sequential pattern, the side edges of adjacent turns of each pass are disposed in generally abutting relation.

Light-weight and extremely durable pipes can be made from fibers or filaments of fiberglass, for example, which can withstand substantial predetermined internal pressure corresponding to a predetermined wall thickness. Such pipe, however, may be buried or submerged and subjected to substantial external pressure tending to collapse the pipe. Large diameter pipe may be designed with a wall thickness to adequately perform under moderate internal pressure, such as 50 to 100 pounds per square inch, for example, but which do not have sufficient stiffness to prevent collapse when submerged under body of water or buried within the earth, particularly when subjected to dynamic crushing forces such as provided by vehicular traffic, for instance.

One possible approach to overcome the collapsing problem of buried or submerged pipe is to wind additional filaments to uniformly increase the wall thickness throughout the entire pipe length. Such uniform increase in pipe wall thickness generally provides strength capabilities far exceeding what is customarily required for expected internal pressures provided by the conducted medium. While increased wall thickness throughout the entire pipe may eliminate the danger of collapse when buried or submerged, an extremely heavy or bulky pipe must be fabricated at an increase in cost.

Reinforcing ribs have been built up or placed along the outer surface of a pipe in order to increase the collapse resistance thereof and provide a relatively light-weight structure. Both semi-circular and hat shaped ribs have been provided such as by banding a plastic, rubber or paper rib form about a pipe which is thereafter overlayed with a glass cloth or fiber wrap impregnated with resin, such as illustrated in U.S. Pat. No. 3,737,353 issued June 5, 1973 to Gilbu and U.S. Pat. No. 3,457,963 issued July 29, 1969 to Hardwick. Many processes require considerable hand labor and are inefficient in time and expense in fabricating reinforcing ribs for tubular articles such as pipes.

SUMMARY OF THE INVENTION

This invention relates to a tubular member having a reinforcing rib attached to an outer surface thereof to provide an extremely collapse resistant ribbed tubular structure and method of make the same.

A plurality of elongated, resin impregnated continuous filaments are employed to make a unique ribbed tubular structure. The continuous filaments include first and second length portions with the first portion formed to provide a tubular member having an outer surface and the second portion arranged in a bundle and helically bonded to the outer surface with adjacent convolutions spaced with respect to each other to provide the reinforcing rib and thus the extremely collapse resistant tubular structure.

The use of continuous filaments such as glass filaments to fabricate both the basic tubular member or pipe and the outer reinforcing rib provides an extremely light-weight construction which is extremely durable and collapse resistant.

In another aspect of the invention, the encircling reinforcing member or rib includes a series of resin impregnated filaments arranged in an elongated bundle which are firmly retained in a compact configuration within the bundle particularly before curing to provide a reinforcing rib of substantial height or thickness. It has been found that by increasing the radial height or thickness of each reinforcing rib, a substantial increase in crushing or collapsing pressure may be withstood by the reinforced pipe. The increased radial height is provided by maintaining the compact configuration of the bundle of resin impregnated filaments particularly before curing. In such manner, the group of fibers are prevented from spreading laterally in an axial direction along the outer surface of the pipe during the winding and curing sequences of pipe fabrication. In a preferred construction, a filament is wound about the elongated bundle and prevents the filaments from spreading along the pipe surface prior to curing. The bundle retaining filament may be helically wrapped about the bundle of fibers to provide a plurality of spaced adjacent convolutions.

The radial rib heighth may additionally be increased by combining an elongated core within the bundle of resin impregnated filaments. In such construction, the core element preferably has a thickness substantially greater than the thickness of the resin impregnated filaments and preferably is made from a low cost material such as plastic or paper or metal. In such manner, the rib height is increased to provide added resistance to collapse at a substantial reduction in cost of materials. The use of a core material selected from the group consisting of plastic and paper and metal in combination with glass filaments provides a light-weight reinforced pipe structure which is extremely durable and collapse resistant.

The reinforcing member or rib is preferably helically bonded over the outer cylindrical surface of the entire pipe length with adjacent convolutions spaced with respect to each other. With such construction, the resistance to external forces may be varied by varying the radial height of the reinforcing rib and the spacing between adjacent convolutions. Added rib height and a reduction of space between adjacent convolutions substantially increases the pipe resistance to collapse but also increases the weight and material costs of the pipe structure. Alternatively, a reduction in the radial rib height and an increase in spacing between adjacent rib convolutions decreases the resistance to collapse but reduces the weight and material cost of the pipe structure.

The invention also provides a unique method of forming a reinforced tubular article in a highly economic manner. In one aspect of the invention, a series of elongated filaments are transferred from a storage station to a pipe forming mandrel. Initially, the filaments are impregnated with a resin binder with a first length portion wound about a supporting surface of the mandrel to form at least one layer providing a tubular article having an outer surface. The second length portion of the series of filaments are grouped and retained in a bundle and helically wrapped about the tubular outer surface with spacing between adjacent convolutions so that the bundle forms a reinforcing rib. The composite construction is thereafter cured to provide a unique ribbed tubular structure which is highly resistant to external loads or pressures.

An auxiliary bundle forming apparatus is used in combination with a filament winding machine to fabricate both the tubular article and the reinforcing rib with a substantial reduction in fabricating steps, many previously requiring manual manipulation. Following the fabrication of the tubular article by the filament winding machine, the second length portion of the filaments are introduced to the auxiliary bundle forming apparatus where the series of filaments or strands are grouped and retained in a bundle. The bundle of filaments formed by the auxiliary bundle forming apparatus is thereafter wound about the tubular outer surface by the filament winding machine to form the reinforcing rib of substantial thickness.

In a preferred construction, the auxiliary bundle winding apparatus winds or wraps a filament or strand about the grouped series of filaments to tightly bind such filaments. The whipping or winding of the grouped filaments forms a tightly secured bundle and squeezes out excess resin. Such a bundle forming sequence desirably prevents the series of filaments from spreading laterally in an axial direction along the outer pipe surface before curing to maintain substantial rib height.

The use of the filament winding machine for fabricating both the tubular article or pipe and the rib provides a substantial saving in time and materials resulting in an extremely economic collapse resistant pipe construction. When fabricating the basic tubular article or pipe structure, the winding machine is operated at a first predetermined speed to wind the first length portion of filaments in a first helix angle about the supporting surface of the mandrel. When the rib is to be formed, the winding machine is operated at a second predetermined speed to wind the bundle of filaments in a second helix angle about the outer surface of the previously formed tubular article. The rotational speed of the mandrel and/or the velocity of lateral movement of the winding head or carriage in an axial direction is selectively varied to uniquely provide the desired spacing between adjacent convolutions of the helically formed rib.

The use of a filament winding machine in combination with an auxiliary bundle forming machine also allows the use of continuous filaments forming both the basic pipe structure and the formed rib. Thus in one form of the invention, it is not necessary to cut or sever the filaments following the fabrication of the basic tubular article. In such a sequence, the continuous filaments are introduced to the auxiliary bundle forming apparatus without cutting or separation which eliminates any need for tying or connecting the wet ends of the resin impregnated filaments to the basic pipe structure. The filament winding machine when operating in the rib forming sequence could also provide a return pass to provide a crossover pattern to the rib, if desired, rather than a helical or spiral pattern as above described.

A spiral guide may be utilized to uniquely incorporate an elongated core within the formed bundle. In such a sequence of fabrication, each of a series of spaced elongated fibers are passed through a separate coil of the spiral guide which is formed as a hoop to provide a central passageway substantially surrounded by the guide. The elongated core is passed through the hoop passageway and the core and fibers which have been passed through the guide are gathered into a bundle and secured about the tubular article to provide the reinforcing rib.

The auxiliary bundle forming apparatus may be employed to wrap or wind a filament about the formed bundle including the core element after passing through the spiral guide. A comb or other type of guide may be optionally employed with the spiral guide to maintain the resin impregnated filaments spaced in a substantially common plane before passage through the spiral guide.

As an example of utilization, the spiral guide is extended to form a cylinder and placed adjacent to the individual spaced fibers so that each fiber is placed within a separate coil of the guide. A retaining rod is thereafter inserted within a central opening of the spiral guide to maintain separation between fibers retained in adjacent coils. The guide element with fibers held in place by the retaining rod is formed into a hoop to provide a central passageway which is substantially surrounded by the guide. The elongated core is passed through the central passageway with both the core and fibers received from the guide gathered into a bundle and wound by the filament winding machine about the outer pipe surface.

The invention provides an extremely useful reinforced tubular structure employing a reinforcing rib which is fabricated in an economical manner.

BRIEF DESCRIPTION OF THE DRAWINGS

FIG. 3 is a perspective view of an auxiliary bundle forming apparatus employed with the filament winding machine in FIG. 1;

FIG. 4 is a perspective view of a length portion of a bundle of filaments formed by the assembly of FIG. 3;

FIG. 5 is a fragmentary cross-sectional view of a ribbed tubular article;

FIG. 6 is an alternative embodiment of an auxiliary bundle forming apparatus which may be employed with the filament winding machine in FIG. 1;

FIG. 7 is a side elevational view of the auxiliary apparatus of FIG. 6;

FIG. 8 is a perspective view of a strand distribution assembly which may be used with the filament winding machine of FIG. 1;

FIG. 9 is a front elevational view of the spiral distribution mechanism shown in FIG. 8;

FIG. 10 is a sectional view of the distribution mechanism of FIG. 9; and

FIG. 11 is a fragmentary cross-sectional view of a ribbed tubular article.

DETAILED DESCRIPTION OF THE DRAWINGS

Figure 1:
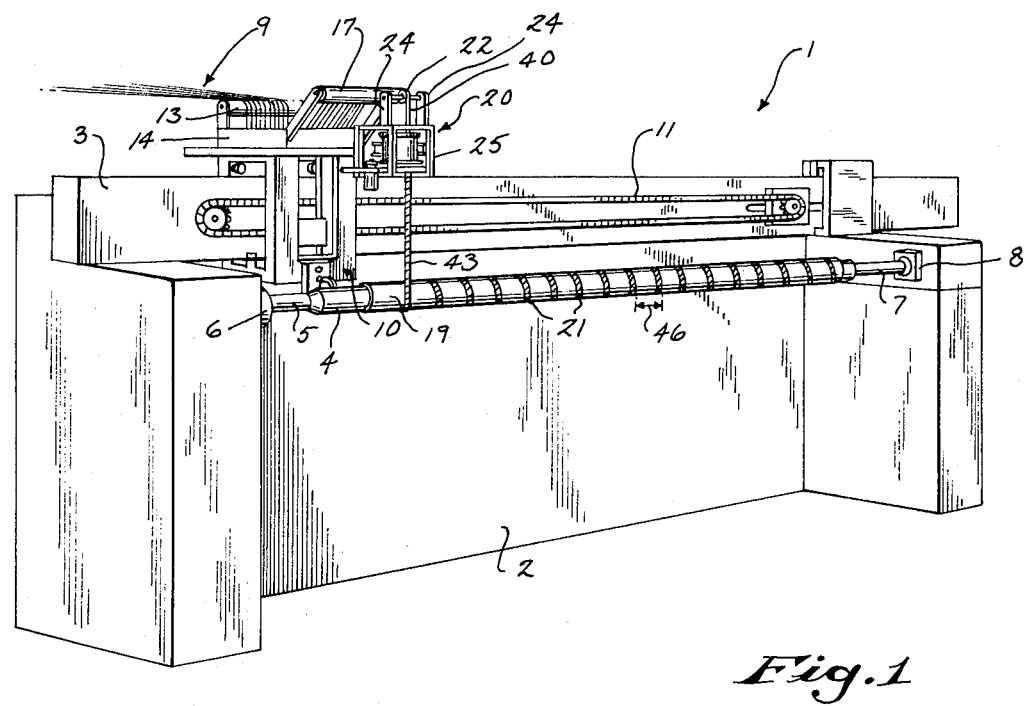
FIG. 1 is a perspective view of a filament winding machine.
Figure 2:
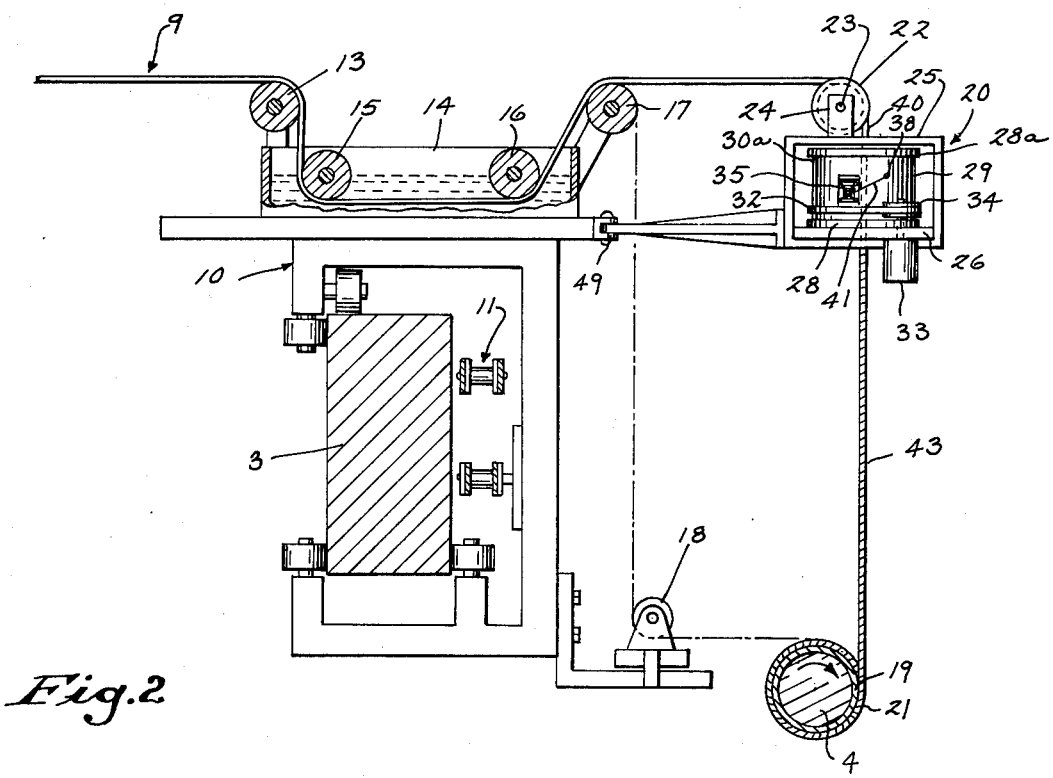
FIG. 2 is a transverse section of the machine of FIG. 1 with parts broken away.

With reference to the drawings and particularly FIGS. 1 and 2 therein, a filament winding machine 1 includes a casing or cabinet 2 providing a horizontal rail 3 extending the length of the cabinet 2. A mandrel 4 is mounted for rotation parallel to the rail 3 and provides an axial end 5 engaged with a drive spindle 6 mounted on the casing 2, while an opposite axial end 7 of mandrel 4 is engaged with an idler spindle 8 attached to casing 2.

A series of fibers or filaments as at 9 are wound about the rotating mandrel 4 by a carriage or winding head 10. The carriage 10 is mounted for reciprocal movement on the horizontal rail 3 and is driven in such movement by a conventional chain drive mechanisim generally indicated at 11. The connection of the carriage 10 to the chain drive 11 is such that the connection will not interfere as the chain rides over the sprockets at the end of its path of travel. The cabinet 2 contains the necessary synchronized operating mechanisms to provide the proper rotation of mandrel 4 and reciprocal movement of the winding head 10 and further contains appropriate gear changing mechanisms to selectively change the speed of the mandrel 4 and winding head 10 to meet variable operating conditions.

The series of filaments 9 are continuous in nature and are unwound from individual creels and passed through a comb (not shown) which may be connected to the carriage 10. After passage through a comb or other strand control mechanism, the series of individual filaments are generally spaced in parallel within a common plane to provide a tape as at 9 having a greater width than thickness. The tape 9 is passed over a roller 13 and into a liquid resin or binder contained within a trough 14 on the carriage 10. Guide rollers 15 and 16 are located within the trough 14 and serve to guide and maintain the series of individual filaments 9 in a generally parallel relationship as the filaments 9 pass through the trough 14. After leaving the trough, the resin impregnated filaments 9 are guided over a roller 17.

With the winding machine utilized to fabricate a pipe, the series of filaments 9 leaving roller 17 pass under a distribution roller 18 and proceed in substantially parallel fashion to be wound about the rotating mandrel 4. During such operation, the distribution roller 18 pivotally moves in a generally horizontal plane so that the winding angle changes from right hand to left hand during reciprocating travel of the carriage 10.

The fibrous tape 9 is composed of substantially continuous, unidirectional fibers or filaments and may take the form of mineral fibers such as glass or abestos, animal fibers such as wool, vegetable fibers such as cotton, synthetic fibers such as nylon, rayon, Dacron, Orlon; metal fibers such as steel wire, and the like.

The resin or adhesive used to impregnate the fiber tape 9 can be any thermal setting or thermal plastic resin commonly used in winding or laminating procedures. For example, the binder can be a thermal setting resin such as epoxy, polyester, melamineformaldehyde, urea-formaldehyde, phenol-formaldehyde, or the like, or the binder can be a thermalplastic resin such as polyvinyl chloride, polyvinylidene chloride or the like. A similar filament winding machine and its operation is shown and described in the U.S. Pat. No. 3,499,815 issued on Mar. 10, 1970 to R. Hof, which is assigned to a common assignee herewith.

Following the completion of a conventional filament winding sequence in which a tubular article such as a pipe is fabricated as illustrated at 19, an auxiliary bundle forming apparatus 20 is utilized to form spiral ribs as at 21 upon the pipe 19 by employing additional lengths of the series of filaments 9.

In using the auxiliary apparatus 20 to form the ribs 21, the series of filaments 9 are removed from the distribution roller 18 and placed within a V-shaped circumferential groove provided by a gathering pulley 22. As illustrated in FIG. 3, the gathering pulley 22 is rotatably mounted through an axle 23 to a pair of spaced supports 24 which, in turn, are fixedly secured to a supporting frame 25. A supporting platform 26 is retained by frame 25 and provides a circular opening 27 which is surrounded by an annular ring bearing assembly 28. A cylindrical tube 29 includes a lower axial end 30 rotatably mounted to the bearing assembly 28 and includes an annular groove 31 receiving a continuous drive belt 32. A variable speed motor 33 is mounted to the supporting surface 26 and includes a drive pulley 34 coupled to operate the pulley 32 and rotate the cylindrical tube 29. An upper axial end 30a of tube 29 may also contain an annular ring bearing assembly 28a also fixedly connected (not shown) to the frame 25.

A pair of spools 35 and 36 each contain a wound coil of continuous filament with both spools rotatably connected to the outer circumferential surface of the cylindrical tube 29 such as through corresponding mounting brackets 37. The spools 35 and 36 are mounted to be adjacent to corresponding openings 38 and 39, respectively, which pass through the cylindrical wall of tube 29.

In operation, the series of filaments 9 are removed from the distribution roller 18 upon completion of the customary pipe fabricating filament winding sequence and placed over the V-shaped gathering pulley 22. The filaments 9, which are substantially adjacent to one another in a substantially horizontal plane after leaving the roller 17, are tightly bunched or grouped as at 40 after leaving the V-shaped pulley 22. A filament 41 supplied from spool 35 is threaded through the opening 38 of tube 29 and attached to the resin impregnated and grouped filaments 40. In like manner, a filament 42 supplied from spool 36 is threaded through the opening 39 and similarly attached to the grouped filaments 40. The filaments 41 and 42 are attached to the grouped filaments 40 at axially spaced points. Rotation of the tube 29 wraps or whips the filaments 41 and 42 about the grouped filaments 40 and provides a secured bundle 43 to be applied to the fabricated pipe 19 and form a continuous rib 21 as illustrated in FIG. 1.

The filament spools 35 and 36 preferably utilize a friction brake mechanism to maintain tension upon the filaments 41 and 42 while they are attached to the grouped filaments 40. During a wrapping sequence, the filaments 41 and 42 desirably squeeze out excess resin retained by the grouped filaments 40. The openings 38 and 39 are desirably spaced on opposite sides of the tube 29 to provide balanced winding forces to the auxiliary bundle forming apparatus 20 and secured bundle 43. The filaments 41 and 42 may take the form of cotton, glass, jute, plastic, monofilament, or other materials commonly available in thread or strand form.

The auxiliary apparatus 20 functions to transform the series of continuous filaments 9 initially employed to fabricate the pipe 19 into a group of filaments 40 which are wrapped or whipped by one or more filaments such as at 41 or 42 to provide a tightly secured bundle of filaments at 43. Following the fabrication of pipe 19, the gear ratio of the reciprocating carriage 10 is changed to increase the rate of travel thereof during the period of time that the wrapped bundle 43 is being applied to the fabricated pipe 19 during the rib forming process. In such manner, a continuous spiral rib 21 is formed with a predetermined spacing between adjacent convolutions. The rotational speed of the mandrel 4 and the lateral speed of carriage 10 can be selectively adjusted to provide the desired helix angle for the spiral rib thereby determining the spacing between adjacent convolutions or coils.

FIG. 5 illustrates the attachment of a wrapped bundle 43 to the outer surface of a fabricated pipe 19. The bundle wrapping such as provided by the filament 41 retains the series of grouped fibers 40 in a compact relationship which remains stable during and after curing. Such bundle wrapping also squeezes out excess resin thereby resulting in improved stability for the cured rib. The rib 21 provides a substantially semicircular cross-sectional shape and maintains substantial height in a radial direction with respect to the tubular pipe 19. The wrapped bundle 43 has been found to substantially increase the height of the formed rib 21 to substantially increase the capability of the ribbed pipe to withstand increased external pressures.

Several pipe were constructed of varying wall thickness, some without ribs and others with a different rib height. Measurements were taken of the tested pipe to determine the wall thickness such as at 44, the rib height such as at 45, the rib spacing such as at 46, and the pipe inner diameter such as at 47. The tested pipes were subjected to continually increasing external, radially directed forces which were recorded at the point of pipe collapse. The following data was observed:

|  | Test No. | Pipe I.D.(47) | Wall Thickness (44) | Rib Spacing (46) | Rib Height (45) | Collapse Pressure |
| --- | --- | --- | --- | --- | --- | --- |
| Ribbed Pipe | 1 | 12.30" | .066 | 2"C-C | .184" | 23 PSI |
| Ribbed Pipe | 2 | 12.30" | .063 | 2"C-C | .197 | 25.5 PSI |
| Unribbed Pipe | 3 | 12.30" | .215 | None | None | 21.6 PSI |
| Unribbed Pipe | 4 | 12.30" | .230 | None | None | 26 PSI |

While not shown or illustrated in the drawings, a return pass could be provided by the winding head 10 to provide a cross-over spiral rib pattern. The employment of the auxiliary bundle forming apparatus 20 may be initiated by stopping the filament winding machine 1 and cutting the filaments 9 at a point after leaving the roller 17. The auxiliary bundle forming apparatus 20 may thereafter be pivoted about a pivotal connection 49 into position with the cut ends of filaments 9 leaving roller 17 bunched and directed over the gathering pulley 22. The filaments 41 and 42 are thereafter tied to the bunched filaments 40 and the secured bundle 43 attached to the outer surface of pipe 19. The filament winding machine 1 is thereafter operated using a different gear ratio and motor 33 activated to rotate tube 29 to wind or whip the grouped filaments 40 with filaments 41 and 42 to provide the wrapped bundle 43.

In order to avoid cutting of the filaments 9 between the pipe forming sequence and the rib forming sequence, it is preferred that tube 29 be formed in two half sections which are releasably separable to permit the entry of the continuous filaments at 40 without requiring cutting or separation. In such manner, an operator would simply gather a slight amount of slack in the filaments 9 and form the bunch 40 by redirecting the fibers 9 over the gathering pulley 22. In such manner, the continuous fibers 9 are used for fabricating the pipe and the rib without severing or cutting such filaments. After the bundle 43 is helically wound about the pipe 19, the entire composite is cured to provide a unitary ribbed tubular article.

An alternative embodiment of an auxiliary bundle forming apparatus 50 is shown in FIGS. 6 and 7 which may be used in lieu of the apparatus 20 shown in FIG. 3. A pair of idler rollers 51 are rotatably mounted to a supporting frame 52 and journal a rotatable disc 53 for relative rotation with respect to frame 52. A brace 54 is connected to support 52 and supports an arm 55 rotatably retaining a friction drive wheel 56. A circumferential groove 57 provided by wheel 56 engages the outer circumferential surface of the disc 53 and provides an axially spaced circumferential groove 58 retaining a drive belt 59. A motor 59a is coupled to a drive pulley 59b which, in turn, rotates belt 59 thereby rotating the friction drive wheel 56 and the disc 53.

The disc 53 provides a central circular opening 60 and an access opening 61 retaining a removably rim section 62. A pair of latches 63 are fixedly connected to the rim section 62 through a pair of rivets or pins 64 and removably connected to the disc 53 at opposite sides of the opening 61 by a series of removably pins or studs 65.

A pair of spools 66 and 67 each contain a filament or thread and provide a friction braking mechanism to control the tension on the respective threads as they are unwound therefrom.

In operation, the auxiliary bundle forming apparatus 50 engages the bunched filaments 40 without requiring separation or cutting thereof so that the filaments 9 may be used continuously for both the pipe and rib fabricating sequences. In this regard, the pins 65 are released and the rim section 62 removed from disc 53. The series of filaments 40 are passed through the access opening 61 and positioned centrally within opening 60 of disc 53. The rim section 62 is thereafter replaced in access opening 61 with pins 65 engaged to secure the assembly. A filament 68 supplied from spool 66 is passed over a series of guide rollers 69 and connected to the bunched filaments 40. In a similar manner, a filament 70 from spool 67 is passed over corresponding guide rollers 7 and attached to the bunched filaments 40 at a location spaced from filament 68.

With filaments 68 and 70 attached the bunched filaments 40, motor 59a rotates the friction drive wheel 56 which, in turn, rotates the disc 53. The threads or filaments 68 and 70 are thus wound or wrapped about the bunch of filaments 40 to provide the secured bundle of fibers 43 similar to that illustrated in FIG. 4 which are guided over a distribution roller 72 and continuously wrapped about the outer surface of the previously fabricated pipe 19 thereby forming the spiral rib 21. The entire composite including the fabricated pipe and the spiral rib is thereafter cured to provide a unitary ribbed tubular article. The use of the removable rim section 62 permits the continuous use of the series of filaments 9 without cutting thereof even when transferring from the customary pipe fabricating sequence to the rib forming sequence.

A strand distribution assembly 74 is illustrated in FIGS. 8–10 and may be employed with the filament winding machine 1. The strand distribution assembly 74 may be employed between roller 17 and the auxiliary bundle forming apparatus 20 and includes a removable comb 75 having a supporting bar 76 providing a series of spaced, normally connected guide teeth 77. The spacing between teeth 77 are designed to maintain separation between the series of parallel spaced filaments 9 leaving the roller 17 while a removable retaining bar 78 engages the outer extending ends of teeth 77 to entrap the series of filaments 9 therein.

A spiral spring 79 is initially retained in an extended position substantially forming a cylinder having an axis substantially parallel with the comb 75. The series of parallel spaced filaments 9 are positioned within adjacent coils of the spiral spring 79 and a flexible rod 81 is inserted through the central cylindrically shaped opening provided by the spiral spring to entrap the filaments therein and prevent their transfer or slippage between adjacent spirals. The spiral springs 79 is thereafter formed into a hoop with opposite ends removably connected thereby providing an annular guide for the series of filaments 9. The annular shaped spiral spring 79 is preferably clamped over an annular support 82 having an outer circumferential recess 83 engaging the hoop shaped spiral spring 79. A retaining assembly 84 includes upper and lower mating sections 85 and 86 each having a semicircular opening as at 87. The openings 87, in turn, each provide a semicircular groove 88 which engages the outer portion of the spiral spring 79. The supports 82 and 84 are retained in spaced relation to each other and sandwich the hoop shaped spiral guide 79 between the grooves 83 and 88 for permitting the filaments 9 to be drawn therethrough with stability.

The support 82 also provides a central circular opening 89 having a predetermined diameter for permitting the passage of an elongated core member 90 therethrough.

The core member 90 is an elongated filament or strand which has a diameter or thickness substantially larger than the diameter or thickness of a filament 9. The core 90 may be formed of a material selected from paper, plastic, and metal. As an example, core 90 may take the form of a twisted paper rope or a foam or plastic rod. In any event, the core 90 is embedded or surrounded by the series of filaments 9 following their passage through the spiral guide 79.

In operation, the series of filaments 9 surround the core element 90 after leaving the spiral guide 79. The core element 90 surrounded by the filaments 9 forming the grouped fibers 40 are wrapped by the auxiliary bundle forming apparatus such as at 50 to form the bundle 43.

The utilization of a core element 90 permits the formation of a spiral rib as illustrated at 91 in FIG. 11 having an increased radial height without requiring additional glass filaments. The use of an inexpensive core material 90 such as paper or plastic or metal not only substantially increases the radial rib height but also reduces the cost of fabricating the reinforced ribbed pipe. The use of the bundle forming apparatus retains the grouped filaments in a tight bundle as illustrated in FIG. 11 to form and maintain substantial rib height as the total composite is cured.

The unique ribbed tubular article provides an improved product which is fabricated with substantial savings in time and cost.

Various modes of carrying out the invention are contemplated as being within the scope of the following claims particularly pointing out and distinctly claiming the subject matter which is regarded as the invention.

I claim:

1. A ribbed tubular structure having an outer surface and reinforcing members secured to said outer surface and forming substantially encircling ribs, said reinforcing members including a series of resin impregnated filaments arranged in an elongated bundle and surrounded by a plurality of filaments helically formed from separate axially spaced filaments separately wound and secured to the bundle and providing a plurality of spaced adjacent convolutions surrounding said elongated resin impregnated filaments.

2. The ribbed tubular structure of claim 1, wherein said filaments consist of glass fibers.

3. The ribbed tubular structure of claim 1, and including a core located within said bundle of resin impregnated filaments and having a thickness substantially greater than the thickness of said resin impregnated filaments.

4. The ribbed tubular structure of claim 1, wherein said filaments consist essentially of glass fibers and said core consists of material selected from the group consisting of plastic and paper and metal.

5. A ribbed tubular structure, comprising a tubular member of resin impregnated fibrous material forming a pipe of predetermined length having an inner substantially cylindrical surface providing an opening for the passage of matter and an outer substantially cylindrical surface, and a helical reinforcing member bonded to said outer surface substantially over said predetermined length with adjacent convolutions spaced with respect to each other, said reinforcing member including a filament-wound composite of a series of substantially continuous resin impregnated glass filaments arranged in a bundle and surrounded by a helical fiber having spaced adjacent convolutions and providing a reinforcing rib of substantial thickness having a substantially semi-circular outer surface in a collapse resistant and essentially rigid ribbed tubular structure which will flex and distort during handling and placement.

6. The ribbed tubular structure of claim 5, and including a core consisting of material selected from the group consisting of plastic and paper and metal located within said bundle of resin impregnated glass fibers and having a thickness substantially greater than the thickness of said resin impregnated glass fibers.

* * * * *

UNITED STATES PATENT AND TRADEMARK OFFICE
CERTIFICATE OF CORRECTION

PATENT NO. : 4,067,362
DATED : January 10, 1978
INVENTOR(S) : ROBERT M. JACKMAN

It is certified that error appears in the above-identified patent and that said Letters Patent are hereby corrected as shown below:

Column 1, lines 8 & 9, After "resistant" delete "rubber" and insert --- tubular---

Signed and Sealed this

Twenty-seventh Day of June 1978

[SEAL]

Attest:

RUTH C. MASON
Attesting Officer

DONALD W. BANNER
Commissioner of Patents and Trademarks